Dec. 27, 1966    G. F. CHMELIK ET AL    3,293,742
METHOD OF PERCUSSIVE WELDING
Filed Dec. 3, 1964
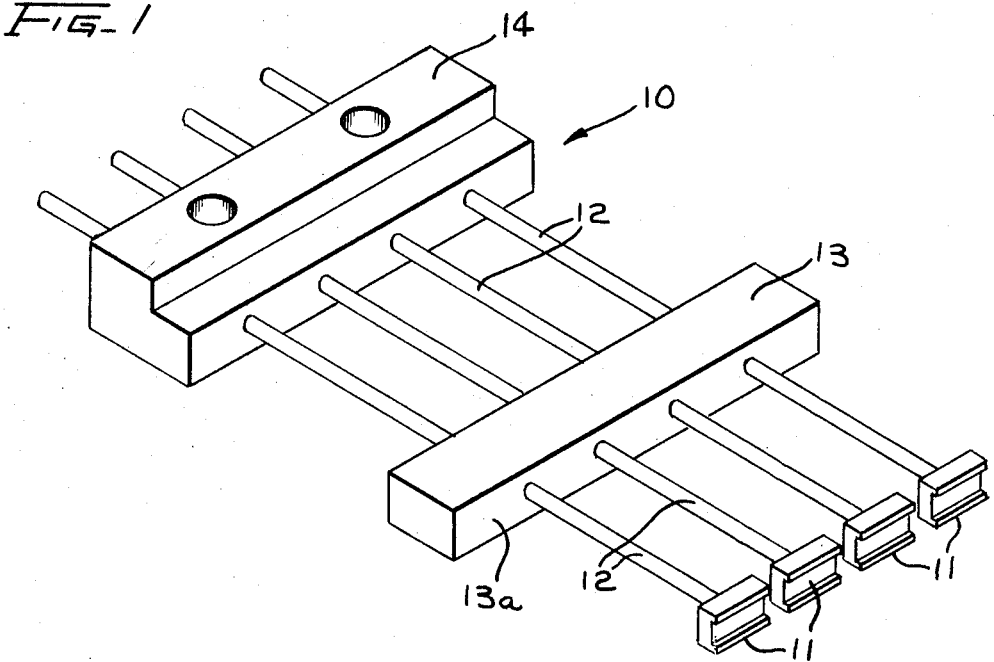
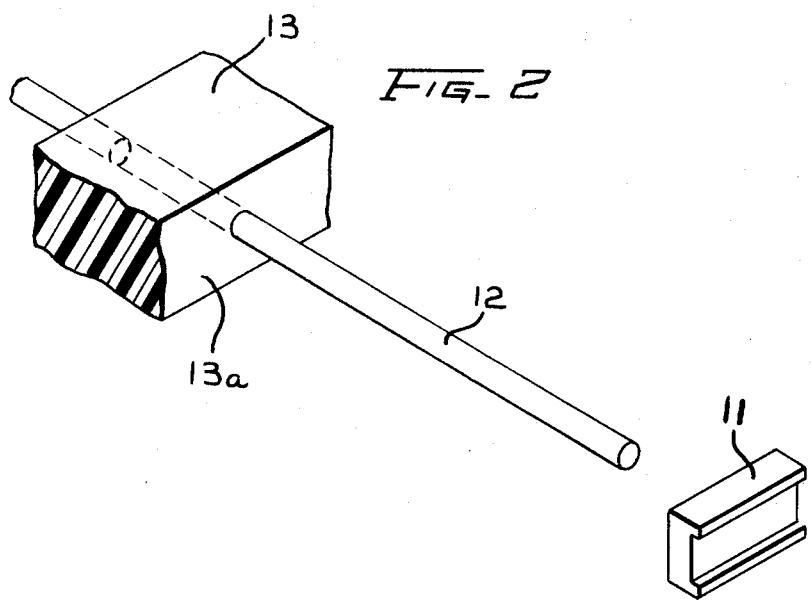
INVENTORS
G. F. CHMELIK
J. DANACZKO, Jr
BY
ATTORNEY

United States Patent Office 3,293,742
Patented Dec. 27, 1966

3,293,742
METHOD OF PERCUSSIVE WELDING
George F. Chmelik, Downers Grove, and John Danaczko, Jr., Oak Park, Ill., assignors to Western Electric Company, Incorporated, New York, N.Y., a corporation of New York
Filed Dec. 3, 1964, Ser. No. 415,683
5 Claims. (Cl. 29—495)

This invention relates to a method of percussive welding and, more particularly, to a method of percussive welding articles together in the presence of a flux. It is an object of this invention to provide an improved method of such character.

Heretofore, various types of fluxes have been employed in percussive welding operations for the primary purposes of insuring a more reliable and/or effecting a stronger bond between the welded parts. Unfortunately, these prior known fluxes have selectively presented a number of problems that have often proven troublesome or costly to cope with in manufacture. For example, the prior fluxes generally were of such a nature that they broke down chemically during the welding operation into carbonaceous by-products that produced smut deposits within the area of the weld. Also, the fluxes were generally of a greasy nature and could only be removed from the surfaces adjacent the weld by a vapor degreasing operation. Other selective disadvantages of such fluxes were that they exhibited the tendency to stain metal surfaces and/or the inability to provide a flux coating of adequate thickness to eliminate problems associated with the spatter of small metal particles against a protected surface during a welding operation.

Accordingly, it is another object of this invention to provide a method of percussive welding which utilizes a fluxing composition that protects against the adverse effects of metal spatter in such a welding operation.

It is still another object of this invention to provide a method of percussive welding which utilizes a fluxing composition that may be removed from percussively welded parts by use of a water rinse rather than a vapor degreasing operation.

It is a further object of this invention to provide a method of percussive welding which utilizes a fluxing composition whose viscositly may be controlled to fit the needs of a particular welding operation.

It is a still further object of this invention to provide a method of percussive welding which is reliable and efficient in operation and economical to utilize.

Additional objects of this invention are to provide a method of percussive welding which utilizes a fluxing composition that is nontoxic and chemically neutral under percussive welding conditions; that is nonstaining toward both ferrous and nonferrous metals; and that affords increased protection against development of smut on the surfaces of the article and object being subjected to the percussive welding operation.

In accordance with this invention, a selected metal surface area of an article is percussively welded to a selected metal surface area of an object in the following manner. A fluxing composition is applied at least to the desired metal surface area of the object. The fluxing composition consists essentially of polyoxyethylated nonylphenol and a suitable agent for adjusting the viscosity of the flux to a range wherein the flux provides a thick, uniform coating over the surfaces of the object to which the flux is applied. The desired metal surface area of the article is then percussively welded to the desired metal surface area of the object having the flux thereon.

This invention, together with further objects and advantages thereof, will best be understood by reference to the following description taken in conjunction with the associated drawings wherein:

FIG. 1 is an isometric view of a completed wire spring relay wherein individual ones of precious metal contacts have been percussively welded to individual ones of extending wire spring fingers; and FIG. 2 is an isometric view of a single wire spring finger and its associated contact before a percussive welding operation has been carried out therebetween.

In FIG. 1 a completed wire spring relay 10 is depicted. The wire spring relay has precious metal contacts 11 percussively welded onto the end portions of extending wire spring fingers 12. The spring fingers are held in spaced relationship by plastic spacing members 13 and 14 which have been molded around the spring fingers in a prior operation. The precious metal contacts 11 have a copper-nickel alloy base with a deposited coating of palladium thereover. The spring fingers 12 are formed from a nickel-silver alloy.

The wire spring relay 10 is utilized in telephone switching equipment. However, it is understood that this invention is applicable to any percussive welding operation and the embodiment disclosed herein of welding precious metal contacts to extending wire spring fingers is simply intended as an illustration of the method of this invention. Also, since percussion welding is a well known and standard welding technique, no full discussion thereof will be presented herein.

This invention is directed to a method of percussive welding employing a fluxing composition which consists essentially of polyoxyethylated nonylphenol and a suitable agent for adjusting the viscosity of the flux to a range wherein the flux provides a thick, uniform coating over the surfaces of the object to which the flux is applied. The polyoxyethylated nonylphenol compositions are a series of homologous compounds wherein members of the series are differentiated by addition of an ethylene oxide group. Such compositions are marketed by Antara Chemicals under the trade name Igepal. The polyoxyethylated nonylphenol series has the following basic structural formula:

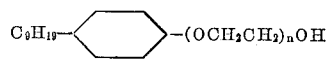

wherein $n$ varies from 4 to 15 for various members of the series which are liquids under standard conditions.

When one of the members of the polyoxyethylated nonylphenol series is used in a fluxing composition, the viscosity of the particular member may be adjusted by a suitable agent, such as coconut oil amide or condensate products of fatty acids and an amine, to fit the required needs of the operation. In certain instances, however, the member of the series selected may have the proper viscosity to fit the needs of the operation and therefore no viscosity adjusting agent is needed to form the fluxing composition.

As an example of the method of this invention, as applied to the percussive welding of precious metal contacts to wire spring fingers, it has been found that the member of the polyoxyethylated nonylphenol series having a nominal $n$ value equal to 10 or 11 may be applied directly as a flux without having its viscosity adjusted. This particular member of the series is marketed by Antara Chemicals under the trade name Igepal CO–710 and it has a viscosity of 200–250 centipoises at 77° F.

Another member of the polyoxyethylated nonylphenol series, having a nominal $n$ value equal to 9, may be applied as a flux after the viscosity thereof has been adjusted by forming a 70–30% by volume solution of this member with coconut oil amide. This particular member of the series is marketed by Antara Chemicals under the trade name Igepal CO-630 and it has a viscosity of 175-200 centipoises at 77° F.

With reference to FIG. 2, the method of this invention is carried out by first coating both the front surface 13a of the plastic spacing block 13 and the extending spring finger 12 of the wire spring relay 10 with a welding flux which consists essentially of polyoxyethylated nonylphenol and a viscosity adjusting agent, if needed, to adjust the viscosity of the flux to a range of 200-250 centipoises at 77° F. When the viscosity of the flux falls within this range, the flux will provide a thick, uniform coating over the surfaces to which it is applied.

The fluxing compositions utilized with the method of this invention have a lower dielectric strength than previously utilized fluxing compositions such as lard oil. As such, during a percussive welding operation, an electric arc is established between the contact 11 and the finger 12 when the two are spaced apart by a greater distance than that at which arcing occurred with prior fluxing compositions. As a result of this factor, the arcing occurs for an increased period of time during the welding operation and a larger amount of metal is melted on both the contact and the finger such that when the two are brought into firm engagement an increased area of bonding will occur therebetween.

Another beneficial result of the increased arcing time between the contact 11 and the finger 12 is that the increased amount of heat developed by such arcing is effective to volatize any dirt or other contaminants that are present on the surfaces to be welded before such surfaces are brought into firm engagement. The fluxing compositions utilized with this invention are also of such a nature that the flux in the area of the arcing is readily volatized without the production of residual by-products when the arcing occurs. Thus, the increased arcing time is effective to cause volatization of all foreign contaminants in the area of the weld whereby smut free surfaces are joined in the welding operation and no residual by-products are entrapped by the fused metal at the point of welding.

The fluxing compositions utilized with the method of this invention are also of such a nature that they provide a protective coating of flux for the front surface 13a of the plastic spacing member 13 which is effective to prevent the embedding of metal particles therein that are spattered thereagainst during the percussive welding operation. Prior percussive welding fluxes generally did not provide, over the whole surface 13a, a flux coating of sufficient uniform thickness to effectively remove heat from the spattered particles, with the result that the metal particles evaporated the flux and still had a sufficient amount of retained heat to burn themselves into the plastic member. If sufficient metal became embedded in the plastic member, an electrical contacting path was established between adjacent spring fingers.

With utilization of the fluxes employed in accordance with the method of this invention, however, the coating is sufficiently thick to provide a heat sink of sufficient capacity such that when a particle of metal spatter is impinged thereon, the heat of the metal particle is dissipated without a total evaporation of the flux coating in the area of impingement. Therefore, a particle of metal spatter impinged on the fluxed surface 13a is initially rapidly cooled by the flux and then, through the action of gravity, slides off the surface 13a. The important function to appreciate in this regard is that the viscosity of the fluxing composition utilized in a particular welding operation must be sufficiently high such that a heat sink of sufficient thermal capacity is provided by a thick, uniform coating of the flux on the surfaces within the area of metal spatter. With such a coating, metal particles impinged on the surfaces in question cannot become embedded therein or attached thereto.

The fluxing compositions utilized with the method of this invention are also water soluble, and have surfactant properties. As such, after a percussive welding operation has taken place, the flux may be removed from the finished part by a simple water rinse, the water rinse removal of the flux also being effective to cleanse the surfaces from which the flux is removed. When prior art fluxes such as lard oil were utilized, it was necessary to carry out a more costly vapor degreasing operation on the percussively welded article in order to remove the flux therefrom.

The fluxing compositions utilized with the method of this invention have several more advantageous characteristics. For example, the fluxing compositions are non-toxic and chemically neutral under percussive welding conditions. In this respect, the flux which is volatized during the welding operation does not break down into a gas of a toxic nature.

The fluxing compositions are nonstaining toward both ferrous and nonferrous metals. As such, no corrosive deposits are formed by the fluxing compositions on the metallic surfaces even though such compositions are left on the metal surfaces for an extended period of time.

The fluxing compositions are also advantageous in that the viscosity thereof may be controlled for a particular welding operation by addition of suitable viscosity modifying agents such as coconut oil amide, coconut acid amide or condensate products of fatty acids and an amine. Although the viscosity of the fluxes may be beneficially adjusted by adding such agents, the addition thereof does not adversely affect any of the beneficial characteristics of the fluxing compositions as previously pointed out.

There has thus been disclosed herein a method of percussively welding a metal article to a metal object which employs a fluxing composition having several advantageous features. Use of the fluxing compositions with the method of this invention provides for a method of percussive welding which is reliable and efficient in operation and economical to utilize. Modification of the various ones of the polyoxyethylated nonylphenol series of fluxes to a proper viscosity with a suitable viscosity adjusting agent for a particular percussive welding operation in accordance with the principles of this invention is deemed to be obvious to one skilled in the art.

While one preferred method of this invention has been disclosed, many modifications thereof will be apparent to one skilled in the art and it is intended that the invention, as claimed, be interpreted as including all modifications which fall within the true spirit and inventive scope thereof.

What is claimed is:

1. A method of percussively welding an article to an object which comprises the steps of:
    applying at least to a selected conductive surface area of the object a welding flux which consists essentially of a liquid polyoxyethylated-nonylphenol and a suitable agent for adjusting the viscosity of the flux to a range wherein the flux provides a thick, uniform coating over the surfaces of the object to which the flux is applied; and
    percussively welding a selected conductive surface area of the article to the selected conductive surface area of the object having the flux thereon.

2. A method of percussively welding a selected conductive surface area of an article to a selected conductive surface area of an object which comprises the steps of:
    applying at least to the selected conductive surface area of the object a welding flux which consists essentially of a member of the polyoxyethylated-nonylphenol series having a structural formula

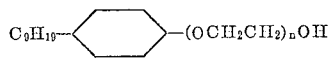

wherein $n$ varies from 4 to 15, and a suitable agent for adjusting the viscosity of the flux to a range wherein the flux provides a thick, uniform coating over the surfaces of the object to which the flux is applied; and percussively welding the selected conductive surface area of the article to the selected conductive surface area of the object having the flux thereon.

3. A method of percussively welding a selected conductive surface area of an article to a selected conductive surface area of an object which comprises the steps of:

applying at least to the selected conductive surface area of the object a welding flux which consists essentially of a member of the polyoxyethylated-nonyl-phenol series having a structural formula

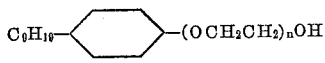

wherein $n$ varies from 4 to 15, and a suitable agent for adjusting the viscosity of the flux to a range of 200 to 250 centipoise at 77° F.; and percussively welding the selected conductive surface area of the article to the selected conductive surface area of the object having the flux thereon.

4. A method of percussively welding a selected conductive surface area of an article to a selected conductive surface area of an object which comprises the steps of:

applying at least to the selected conductive surface area of the object a welding flux which consists essentially of

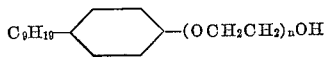

wherein $n$ varies from 10 to 11; and percussively welding the selected conductive surface area of the article to the selected conductive surface area of the object having the flux thereon.

5. A method of percussively welding a selected conductive surface area of an article to a selected conductive surface area of an object which comprises the steps of:

applying at least to the selected conductive surface area of the object a welding flux which consists essentially of 70% by volume of

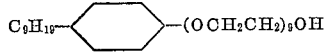

and 30% by volume of coconut oil amide; and percussively welding the selected conductive surface area of the article to the selected conductive surface area of the object having the flux thereon.

References Cited by the Examiner

UNITED STATES PATENTS 2,485,790 10/1949 Trott _____ 219—96
3,118,048 1/1964 Fisher et al. _____ 219—92

JOHN F. CAMPBELL, *Primary Examiner.*